May 17, 1960

P. E. BIEMILLER 2,936,571

COUNTERBALANCE FOR BALANCE WHEEL

Filed Feb. 10, 1956

INVENTOR.
Philip E. Biemiller

BY

ATTORNEY

United States Patent Office 2,936,571
Patented May 17, 1960

2,936,571
COUNTERBALANCE FOR BALANCE WHEEL

Philip E. Biemiller, Landisville, Pa., assignor to Hamilton Watch Company, Lancaster, Pa., a corporation of Pennsylvania Application February 10, 1956, Serial No. 564,723

5 Claims. (Cl. 58—28)

This invention relates to a balance wheel for battery driven electric wrist watches.

In the making of balances for electric wrist watches a coil can be mounted in lieu of a section of the rim of the balance wheel, one side of the coil being formed in an arc corresponding substantially to the curve of the rim of the balance wheel. The coil is mounted in the balance wheel and diametrically opposite it has been the custom to carry a plurality of counterbalancing screws on the rim of the balance wheel. Because of the comparatively large weight of the coil it is necessary to group these screws closely and to make them of comparatively large weights. In poising the balance wheel the removal and replacement of the screws is made particularly arduous due to the closeness with which the screws are mounted.

The coil which is mounted on the balance wheel is a comparative large weight mounted so that the weight, so far as poising is concerned, is concentrated at a radial line running through the center of the coil. This must be counterbalanced at a point which is substantially diametrically opposite the center of this coil. Other factors, such as the contact strip and the little fixtures that hold the coil, enter into the poising of the coil. By means of a small machine the coil may be dynamically poised, that is the preponderance of weight and its angular position on the rim of the balance wheel can be determined in a number of different positions in which the watch is held and a resultant arrived at which can be accurately determined both as to weight and angular position. By making the counterbalancing weight slightly heavier than necessary, in the final dynamic poising of the balance wheel it will always be necessary to remove a certain amount of weight, and by using a single mass the weight can be removed at the exact angular position desired and by the exact amount. This makes it easy to poise a balance wheel and makes the operation much less expensive.

This particular invention is directed to a counterbalancing weight which is mounted in a various number of ways opposite the coil on the balance wheel rim.

It is the object of this invention to provide a counterweight for a balance wheel adapted to be mounted diametrically opposite a functional inserted part of the balance wheel.

It is a further object of the present invention to provide a single piece counterweight for a balance wheel from which weight may be removed by filing, grinding or sawing.

It is a further object of the present invention to provide a weight to be used as a counterbalance for a coil for a balance wheel for electrically operated wrist watches, wherein certain areas are provided on the balance wheel from which metal may be removed in the poising of the balance wheel.

The invention is illustrated in the accompanying drawing in which.

Figure 1:
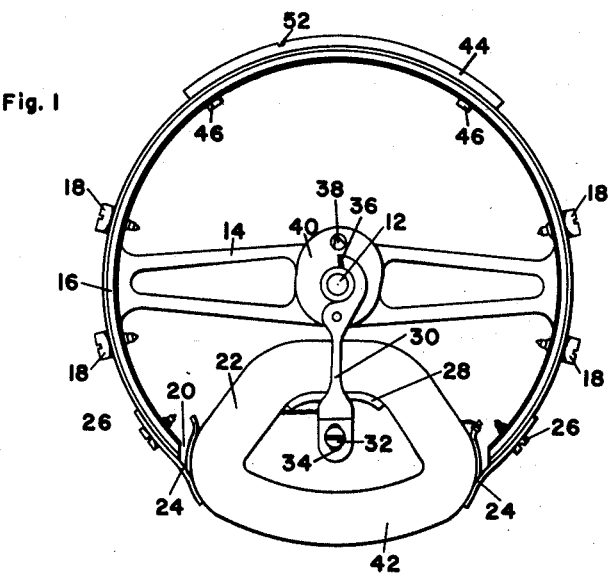
Figure 1 is a top plan view of the balance wheel.

Referring particularly to Figure 1, a balance staff 12 is shown supporting a balance wheel having cross arm 14, a rim 16, counterbalancing screws 18 and formed with a portion of the rim broken out as at 20.

Between the ends of the rim a coil 22 is mounted by means of fixtures 24 which are secured to the coil by an adhesive and adjustably fastened to the balance rim by screws 26. The coil carries a bracket 28 on which a contact arm 30 is adjustably mounted by screw 32 passing through slot 34. By means of the adjustment for mounting the coil and the adjustment of the contact arm 30 through the slot 34, the contact end 36 may be accurately positioned with respect to the pin 38 mounted in the roller 40.

Figure 5:
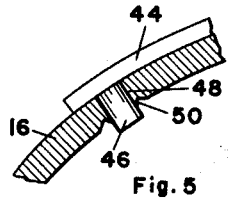
Figure 5 is a detail view partly in section showing a method of securing the counterweight to the rim.

The positioning of the coil 22 so that one side 42 of the coil is substantially in the arcuate path of the rim of the balance wheel places a preponderance of weight which must be counterbalanced diametrically opposite by some weight on the rim. This has been heretofore done by mounting a plurality of screws. A weight consisting of an arcuate shaped member 44 concentric with the rim of the balance wheel and slightly larger so that it fits the rim of the balance wheel is secured by a pair of feet 46 passing through holes (see Figure 5) 48 formed in the rim 16 of the balance wheel, and having the rim of the balance wheel swaged as at 50 against the feet to hold the counterbalancing weight 44 in position. These weights are made slightly heavy so that in poising the wheel a portion of the metal may be removed at the proper position by filing a kerf, as shown at 52. A skilled operator can generally remove the correct amount to poise the balance wheel in one or two operations.

Figure 2:
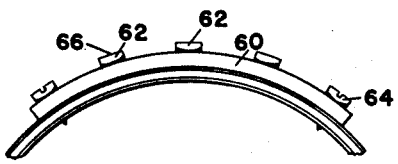
Figure 2 is a view showing the modification of the counterbalancing member.

Referring particularly to Figure 2, a modification is shown in which the counterbalancing weight 60 is formed with a series of integral studs 62 and is secured to the balance wheel by screws 64. Removal of the metal is made by filing the flat surface 66 of the studs.

Figure 3:
Figure 3 is a further modification.

Referring to Figure 3 a counterbalancing weight 70 is shown secured to the rim by an adhesive 72 and is adapted to be filed at any position the same as the weight shown in Figure 1.

Figure 4:
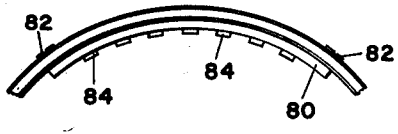
Figure 4 is a still further modification of the balance wheel.

Figure 4 shows a weight 80 held on the inside of the rim by screws 82. This weight is formed with inwardly projecting studs 84 which are filed to remove excess weight. Such a construction, as shown in Figure 4, would permit the use of a slightly larger balance wheel.

What is claimed is:

1. A balance wheel for an electric watch comprising a rim having a cutaway portion, a coil mounted on said rim between the ends of said rim formed by said cutaway portion, and an arcuate weight secured to said rim diametrically opposite said coil, said weight being slightly heavier than necessary to counterbalance said coil, whereby the balance wheel may be poised by removing a small amount of the weight at the exact angular position necessary.

2. A balance wheel as set out in claim 1 wherein said weight is secured to the outside of the rim.

3. A balance wheel as set out in claim 1 wherein said weight is secured to the inside of the rim.

4. A balance wheel as set out in claim 1 wherein said weight is secured to said rim by an adhesive.

5. A balance wheel as set out in claim 2 wherein said weight has a plurality of integral studs extending radially outward therefrom.

References Cited in the file of this patent

UNITED STATES PATENTS

| | | |
|---|---|---|
| 325,602 | Guernsey | Sept. 1, 1885 |
| 2,116,257 | Aegler | May 3, 1938 |
| 2,239,668 | Aegler | Apr. 29, 1941 |
| 2,495,858 | Marti | Jan. 31, 1950 |
| 2,806,908 | Van Horn et al. | Sept. 17, 1957 |

FOREIGN PATENTS

| | | |
|---|---|---|
| 20,366 | Switzerland | Oct. 29, 1899 |
| 276,197 | Switzerland | Sept. 17, 1951 |
| 1,100,227 | France | Mar. 30, 1955 |